March 10, 1959  C. ZELNICK  2,876,552
MACHINISTS' GAUGES
Filed April 9, 1956

INVENTOR.
CHARLES ZELNICK
BY
*Searman & Searman*
ATTORNEYS

United States Patent Office 2,876,552
Patented Mar. 10, 1959

2,876,552

MACHINISTS' GAUGES

Charles Zelnick, Saginaw, Mich., assignor to Lufkin Rule Company, Saginaw, Mich.

Application April 9, 1956, Serial No. 576,854

5 Claims. (Cl. 33—162)

This invention relates to machinists' gauges and more particularly to certain novel and useful improvements in means for locking the depending clamp screw of the gauge head in a given position on the gauge base and adjusting the gauge head with respect to the clamp screw.

Prior gauges of the type shown in Koning patent No. Re. 22,921 employed an angular clamping plate which seated upon the lower portion of the gauge head and it was this plate which was connected to the gauge head. The plate was clamped lightly in position on the gauge head when the latter was roughly adjusted to a measuring position at the same time that the clamping plate in the T slot of the gauge base was drawn up into frictional engagement with the upper marginal wall of the slot. In order for the gauge head to be adjusted to a final, precise setting the clamping plate in the T slot had to exert a frictional resistance to movement which was greater than the gauge head's inertia and frictional resistance to movement. Otherwise the gauge head would not move relative to the base and frequently, of course, it happened that the clamping plate in the T slot was not in fact clamped with sufficient pressure in view of the fact that the gauge head's resistance was increased by the pressure of the angular plate. Further, of course, when the clamping plate in the T slot was drawn up into clamping engagement with the upper walls of the slot to effect a fine adjustment, the clamping nut had to be revolved to release it so the gauge head could be moved to a new position of rough adjustment, and then the clamping nut had to be manipulated to draw the clamp plate upwardly into engagement with the walls of the slot once again to hold the head in the new position.

Previously I had designed a gauge to overcome the latter and other defects in planer gauges in which a rockable wedge plate was mounted off center directly on the lower end of the clamping screw. Because the plate was mounted off center on the screw, certain disadvantages were noted which the instant gauge is designed to eliminate, although this prior gauge was a considerable improvement over the friction type gauges mentioned. For instance, the rockable plate was much more securely held against movement in one direction than in the other direction. Also tilting of the clamp screw was possible about the point of pivotal connection of the screw to the rockable plate, which resulted in some lost motion in the fine adjustment of the gauge head.

One of the prime objects of the instant invention is to provide a novel gauge wherein a pair of wedging dogs are pivotal into mechanically locked engagement with the upper and lower walls of the slot in the gauge base on opposite sides of a clamping foot to lock the clamp screw with equal force against longitudinal movement in either direction.

A further object of the invention is to design a novel gauge of the type described wherein spring means normally maintains the wedging dogs in locked engagement so that a fine adjustment may be effected, however, the gauge can be easily moved on the base to a new position of rough adjustment by simply depressing the spring means, which pivots the dogs into longitudinal alignment with the clamp foot and permits their free movement in the base slot.

Another object of the invention is to provide a novel and improved gauge in which the clamp screw is linked to the gauge head and the need for the former angular clamping plate whose frictional resistance had to be overcome in effecting a fine adjustment is eliminated.

A further object of the invention is to design a gauge of the type described in which the clamp screw is normally positively locked in position by oppositely disposed wedging dogs which will not permit the clamp screw to tilt in either direction, so that fine adjustment can be very efficiently effected without lost motion by moving the gauge head relative to the upper end of the screw.

Another object of the invention is to provide a gauge of the character described which can be secured so that it will not slip when jarred or roughly handled so that accurate measurements can be made under difficult conditions.

A further object of the invention is to design a machinist's gauge of relatively simple and durable construction which can be easily and more economically manufactured and assembled, and which can be readily dismantled as well for replacement of parts or the like.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

Figure 5:
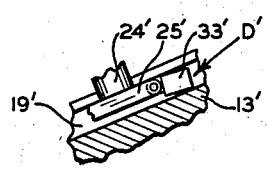
Fig. 5 is a similar view illustrating a modified embodiment of the invention.

Referring now more particularly to the accompanying drawings wherein I have shown a preferred embodiment of the invention, a letter G generally indicates a machinist's gauge which includes a conventional triangular base 13 having an oppositely disposed, substantially triangular gauge head 14 mounted for sliding movement thereon. Provided in the base 13 is a triangular shaped opening 15 having a marginal web 16 in which spirit levels 17 and 18 are mounted as usual.

An inverted T slot 19 is machined in the hypotenuse face of the base block 13 and the face is formed with transversely inclined way portions 20 which are pitched toward the slot 19. The complementally inclined face of the gauge head 14 is shaped to fit in facial contact with and slide on the way portions 20 and it will be seen that the head 14 has a similar triangular opening 21 and a conventional step 22.

A clamp screw assembly C extends through an elongated slot 23 provided in the lower inclined portion of the gauge head and includes a clampe screw 24 having a foot 25 integrally formed on the lower end thereof. Mounted on the screw 24 is a nut 26 having a shoulder section 26a and a counterbore 27 is provided in the nut to accommodate a spring 28 which is provided on the screw 24 to urge the screw upwardly or outwardly (see Fig. 1). A washer 29 is mounted on the screw to function as a spring support and prevent the spring from creeping into opening 23.

Figure 4:
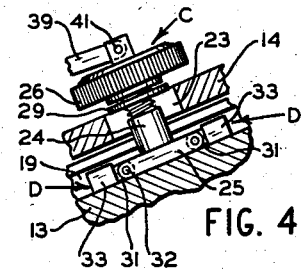
Fig. 4 is a fragmentary, sectional side elevational view with the clamp screw shown in depressed position so that the gauge head may be easily moved along the gauge base.
Figure 2:
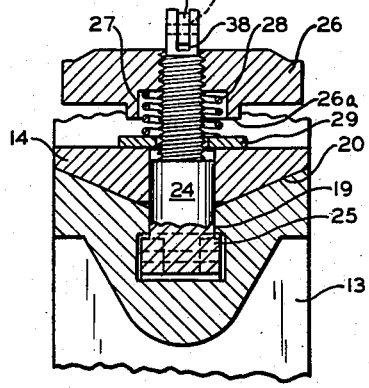
Fig. 2 is an enlarged, transverse sectional view taken on the line 2—2 of Fig. 1.
Figure 3:
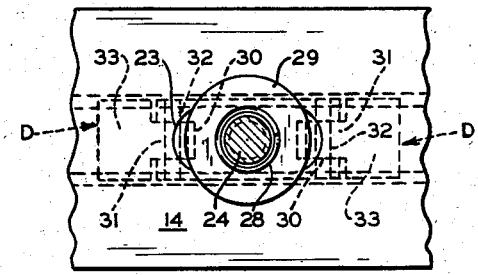
Fig. 3 is an enlarged sectional plan view taken on the line 3—3 of Fig. 1.
Figure 1:
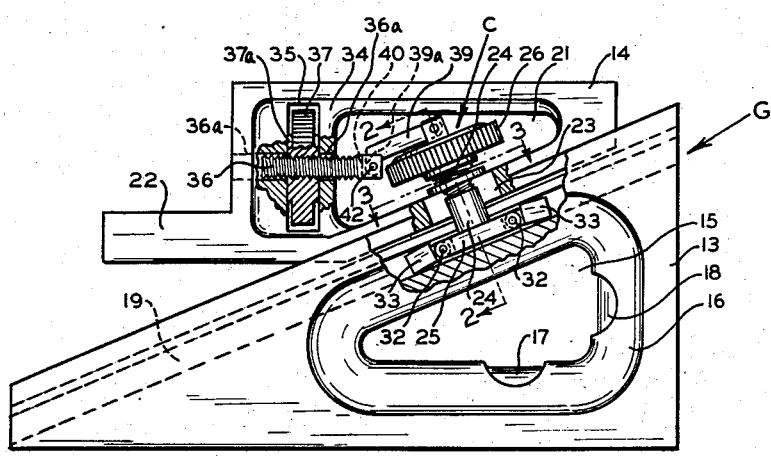
Fig. 1 is a side elevational, partly sectional view of my improved gauge showing the wedge plates in normal position fixing the clamp screw on the base so that the gauge head may be adjusted relative thereto.

In order to pivotally receive a pair of wedging dogs D the foot 25 of the screw is bifurcated at both ends as at 30 (Fig. 3). Each wedge dog D includes a stem section 31 provided with an opening to receive the pin 32 which secures the dog to the foot. The stem sections 31 of the dogs are of about the same thickness as the foot 25 however it is important to observe that the enlarged, shouldered sections 33 of the dogs project a slight distance above the foot 25 (see Fig. 4) so that, if the foot is moved upwarly from the position in which it is shown in Fig. 4 to the position in which it is shown in Fig. 1, the sections 33 engage the upper marginal walls of the T slot 19 and are pivoted into wedged engagement with the upper and lower walls of the slot. When the dogs are in the tilted position in which they are shown in Fig. 1 the clamp screw assembly C is locked in position on the base.

Provided within the gauge head 14 in a web portion 34 of reduced thickness is a vertically extending slot or opening 35 and it will be seen that an adjusting screw 36 extends longitudinally through said opening 35 into the triangular opening 21. A nut 37 is mounted on the screw 36 within the opening 35 and it will be seen that shoulders 37a are provided on the nut in bearing engagement with the marginal side walls of slot 35 so that the nut is restrained from axial movement in the slot 35. The screw 36 extends freely through enlarged openings 36a in the gauge head on both sides of the slot 35. Provided in the upper end of the clamp screw 24 is a slot 38 which receives one end of a link 39. The opposite depending end 39a of link 39 is received within a slot 40 provided in the inner end of adjusting screw 36, and pins 41 and 42 pivotally connect the link 39 to the clamp screw 24 and adjusting screw 36 respectively. It is the link 39 which forms the connection between the clamp screw 24 and the gauge head in the sense that the gauge head is reactable from the screw 24 and, when the nut 37 is revolved, the gauge head, including the nut 37, moves relative to the screw 36 provided the dogs D are in locked engagement with the walls of the T slot 19 as in Fig. 1.

The normal position of the clamp screw 24 and dogs D is illustrated in Fig. 1. The spring 28 exerts sufficient force to pull the foot 25 upwardly to the point where the dogs D tilt into wedging engagement. If the nut 37 is now revolved the gauge head 14 can be adjusted to the desired finely adjusted position.

In order to move the gauge head 14 freely on the base 13 to a position of rough adjustment, it is only necessary to press down on the nut 26 which moves the foot 25 downwardly to the position in which it is shown in Fig. 4. The dogs D are pivoted by the foot to a position of alignment therewith so that the assembly can move freely in the T-slot. Then, once the gauge head 14 is roughly adjusted, the nut 26 is released and the gauge head can be finely adjusted as above set forth. To prevent inadvertent jars or shocks from disturbing the position of the gauge head once it has been set in this manner, the nut 26 may, of course, be turned down on the screw 24 to increase the force which wedges the dogs D into locked position.

It is important to note that the pins 32 are spaced an equal distance from the axis of the clamping screw 24 and the identical dogs D accordingly engage the walls of the T slot when in tilted position at points equidistant from the axis of the screw 24. Thus the resistance to movement of the dogs D in the slot in either direction is equal and more important the dogs act with an equal and opposite restraining force to positively prevent tilting of the clamp screw in the slot 23. This is particularly important because the pull which would tend to tilt the clamp screw 24 is applied at the top of the screw while the forces restraining the tilting are applied at the lower end thereof. It will be apparent that I have been able to eliminate the undesirable slide plate, previously mentioned as being connected to the gauge head in prior art constructions, by providing effective and balanced locking members D of the type shown which, when locked, are in inversely disposed relation. Each of the oppositely inclined dogs more positively opposes movement of the clamp screw in one direction than in the other but obviously each opposes movement in both directions to some extent. The provision of the rigid foot 25 on which the dogs are pivotally mounted tends to stabilize the dogs when the clamp screw 24 is pushed downwardly so that they slide in the T slot 19 freely and smoothly and do not tend to snag in the slot if the pressure is slightly abated unintentionally.

In Fig. 5 I have shown a further embodiment of the invention in which only a single dog D' is provided on the foot 25' of the clamp screw 24' and the shouldered section 33' of the dog projects downwardly. In this modification of the invention the foot 25' is brought substantially up into frictional engagement with the upper marginal walls of the T slot 19' before the dog D' wedges into locked engagement. Thus the locking action of the dog is supplemented by the frictional engagement of the foot with the walls of the T slot when the gauge head is locked in position for fine adjustment. To insure that the gauge head will remain in this position the clamp screw 24' can be drawn up slightly to clamp the foot 25' more tightly and force the edges of the hardened steel dog D' into the walls of the slot 19'. With the flat upper surface of the rigid foot 25 in engagement with the upper marginal wall of the slot 19' as in Fig. 5, obviously the clamp screw 24' cannot tilt. Except for the differences to which attention is directed the gauge of this embodiment of the invention is identical with the gauge previously described.

It should be apparent that I have perfected a considerable improvement in gauges of this type and have designed a smoothly working, practical gauge which will be widely employed.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. In a gauge, a base block having an inclined surface, a gauge head seated upon said surface and slidable thereon, said surface having a slot therein including a portion of restricted width communicating with said surface, and an undercut portion of enlarged width communicating with said portion of restricted width, a clamping post for said gauge head extending through the restricted portion of said slot into the enlarged portion thereof, a laterally extending foot on the lower end of said post fixed against rocking movement in a vertical plane with respect to the post, and dogs pivotally connected to opposite ends of said foot at spaced distances from the axis of said post, said dogs being tiltable in opposite directions to wedgingly engage opposite walls of the undercut portion of said slot on each side of the post and positively restrain tilting of the post in both directions to fix the post in position so that the gauge head can be adjusted relative thereto without lost motion.

2. In a gauge, a base block having a slide surface, a gauge head seated upon said slide surface and movable thereon, said surface having a slot formed therein with upper and lower marginal walls defining an undercut portion of enlarged width, a depending post for said gauge head extending into said enlarged portion of the slot, a laterally extending plate of less width than the depth of said portion of the slot on the lower end of said post disposed within said portion of the slot, and at least one dog rockably connected to an end of the plate for swinging movement about an axis spaced from the axis of said post, said dog having a surface projecting above said plate which will be engaged by the upper marginal wall before the plate when the plate is drawn upwardly to pivot the dog into wedged relation with the upper and lower marginal walls and fix the post in the slot so that the gauge head can be adjusted relative thereto.

3. In a machinist's gauge, a triangular base block having an inclined surface, a gauge head seated upon said surface for sliding adjustments therealong, said surface having a longitudinally extending T slot formed therein with upper and lower marginal walls defining the enlarged undercut portion of the slot, the gauge head having a lower portion with an elongated slot therein, a depending clamp screw extending through said slot and having a limited longitudinal movement therein extending down into the enlarged portion of the slot, an integral foot plate on the lower end of said clamp screw extending longitudinally beyond the screw in the said portion of the slot in both directions, the foot plate being bifurcated at both ends, dogs having stems pivotally received in the bifurcated portions of the plate at each end, said stems of the dogs being of the width of the plate and the dogs including enlarged shoulder ends projecting above said plate and pivoting the dogs into oppositely disposed tilted position in wedged engagement with the upper and lower walls of the said portion of the slot when the foot plate is drawn upwardly, means including a link connected to the upper end of the screw to effect a final precise adjustment of said gauge head on the block when the dogs lock the clamp screw in position and prevent tilting thereof, and a nut threaded on said gauge head below the connection of said link to the screw tightenable down on said gauge head to more tightly wedge said dogs and more firmly clamp said gauge head on the base block.

4. A gauge comprising a base block having an inclined face; a gauge head seated on said inclined face for sliding movements therealong, said base block having a slot therein parallel to said face and in communication therewith, said gauge head having an opening therein; a clamping post extending through the opening in said gauge head and into said slot in the base block; a foot member received in said slot and fixed to said post; a dog pivotally connected to each of the ends of said foot member for pivotal movement of each dog relative to said foot about an axis spaced from said post, each of said dogs being of such size relative to said slot as to be pivoted into wedged engagement with opposed walls of the latter; means reacting between said post and said gauge head for urging said dogs into lightly wedged engagement with opposed walls of said slot; adjusting means reacting between said gauge head and said post operable to move said gauge head relatively to said post and said base block when said dogs are in lightly wedged engagement with opposed walls of said slot, said adjusting means comprising a screw mounted in said gauge head, means for effecting reciprocating movements of said screw, and link means pivotally interconnecting said screw and said post; and means reacting between said post and said gauge head operable to pivot said dogs into clamping wedged engagement with opposed walls of said slot to secure said gauge head in a selected position of adjustment relative to said base block.

5. A gauge comprising a base block having an inclined face; a gauge head seated on said inclined face for sliding movements therealong, said base block having a slot therein parallel to said face and in communication therewith, said gauge head having an elongated opening therein; a clamping post extending through the opening in said gauge head and into said slot in the base block; means connected to said post and located in said slot for fixing said post against movement relative to said base block; means reacting between said post and said gauge head for clamping the latter lightly against said base block in a position of rough adjustment; and means interconnecting and reacting between said post and said gauge head for adjusting the latter relatively to said base block to a position of precise adjustment, said means interconnecting and reacting between said post and said gauge head including an adjusting part mounted on said gauge head for movement relative thereto, means for moving said adjusting part, and a link connected at one of its ends to said adjusting part so as to be movable with the latter and connected at its other end to said post.

References Cited in the file of this patent
UNITED STATES PATENTS

| | | |
|---|---|---|
| 1,257,040 | Steuernagel | Feb. 19, 1918 |
| 2,471,684 | Hastings | May 31, 1949 |
| 2,694,861 | Zelnick | Nov. 23, 1954 |